E. Allen,
Wind Wheel.
Nº 17,862.        Patented July 28, 1857.
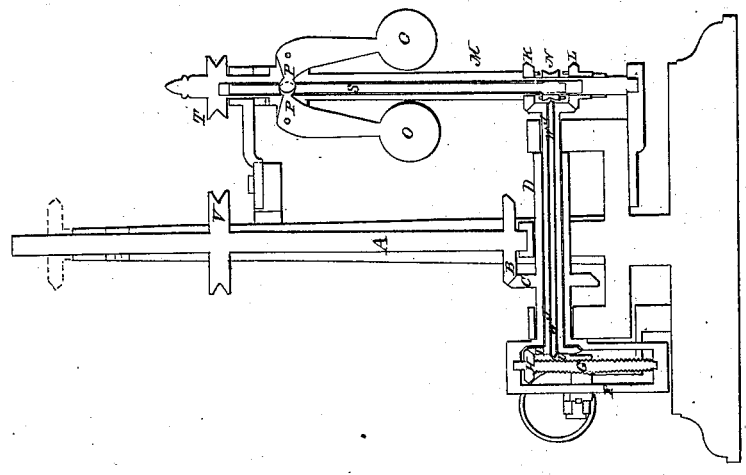
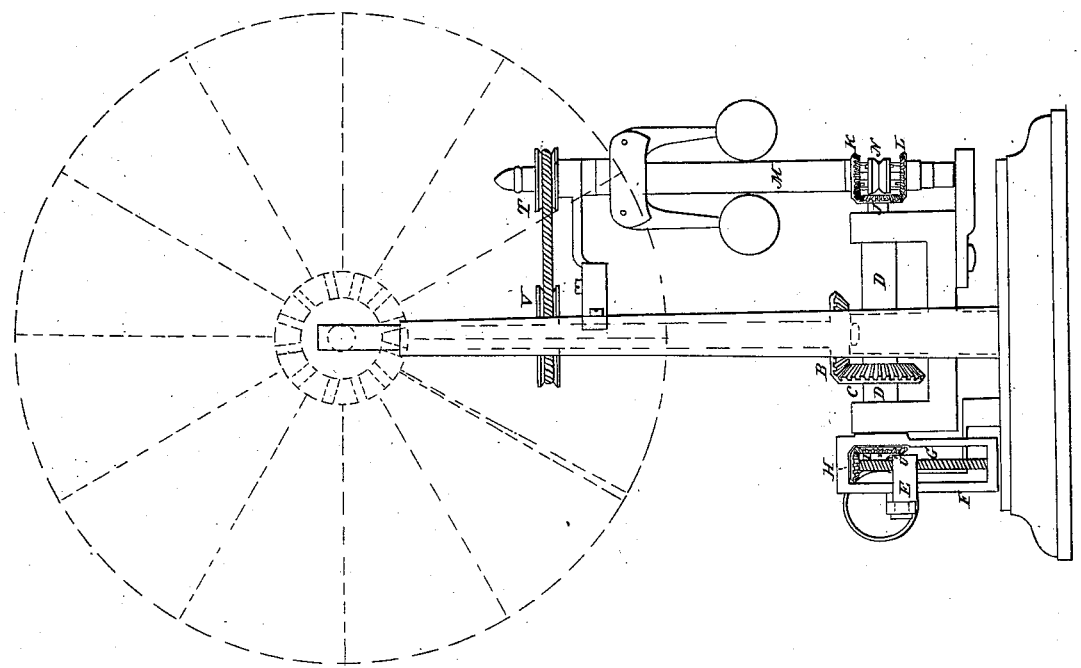

UNITED STATES PATENT OFFICE.

ETHAN ALLEN, OF WORCESTER, MASSACHUSETTS.

IMPROVEMENT IN GOVERNORS FOR REGULATING THE WORK OF WINDMILLS, &c.

Specification forming part of Letters Patent No. 17,862, dated July 28, 1857.

*To all whom it may concern:*

Be it known that I, ETHAN ALLEN, of the city and county of Worcester, and State of Massachusetts, have invented certain new and useful Improvements in a Governor Applicable to Windmills; and I do hereby declare that the following is a full, clear, and exact description of the construction and operation of the same, reference being had to the drawings herewith presented, in which—

Figure 1 is an elevation, and Fig. 2 is a section through the center in the same plane, the same letters denoting the same parts in each.

The object of my invention is to regulate the work performed by the mill under varying conditions instead of regulating the power, as is more usually done, and although a somewhat similar system of regulating the performance of windmills is shown in the English patent of George Medhurst, yet the peculiarity of my invention consists in such an arrangement and combination of a sliding stop-rod with an automatically-expanding crank that while the stroke of a piston is proportioned to the amount of power or speed in the windmill the adjustable crank-pin shall at either extreme of its traverse act upon and confine the play of the governor, so that its regulation shall always be restricted to certain desired limits. This constitutes the distinctive characteristic of my invention, and although it may be connected with plans for varying the surface exposed to the wind, yet its action is entirely independent, being calculated to do a little work when the wind is light, and on an increase of wind to increase its work performed in a corresponding ratio, or nearly so.

To construct my invention, to the upright shaft A attach a gear B to drive the gear C, attached to the crank-shaft D. To the shaft D attach the sliding crank-pin E, made adjustable on its slide F by means of the screw G, the screw G having a gear H driven by a gear I, attached to shaft J, running through the shaft D, and having a gear on its other end operated by either of the gears K or L, which are placed loose on the stem M of the regulator and have small dogs or catches to correspond with similar ones in the clutch N, running between them. The regulator consists of the balls O O, with their inner arms P P, operating the rod S, attached to the clutch N, the whole being driven by the pulley T with belt from pulley V on the shaft A. To the slide E attach a wedge-like projection U in such position as to strike against the end of the rod W and press it back at the proper time, the said rod W passing through the shafts J and D and its end playing into a groove in the clutch N in such a manner as that when it is pressed in it will force the clutch N into a middle position between the two gears K and L, whatever the velocity of the balls O O, and at other times to allow the clutch free play. To the crank-pin E attach the connecting-rod from the pump or work to be performed. The vanes or arms may be of the vertical form, as shown by the dotted lines, giving motion to A by means of bevel-gear, or, if preferred, the horizontal form may be attached to the shaft A. In either case any of the common forms preferred may be used, and on that account no more particular description is deemed necessary.

The operation may perhaps be most clearly described by considering the whole in operation with a moderate breeze, the balls of the regulator being slightly elevated, so as to bring the clutch N between the gears K and L. Affecting neither, they will then turn with the shaft J the same velocity as the shaft D, thus leaving the pinion H and screw G still holding the pin E, perhaps, midway from its center of motion to its length of slide, giving a medium length of stroke. Then on an increase of wind the balls are raised by increase of speed and throw the clutch N down, which, catching the gear L, drives the shaft J and turns the screw G, moving the pin E on its slide farther from its center of motion, thus increasing its length of stroke and work, and on a decrease of wind the balls falling throw the clutch N into the gear K, which turns J and the screw G in the opposite direction, moving the pin E toward its center of motion, and thus shortening its length and amount of stroke and work, and by this means always adjusting the length of the crank and consequent stroke of the pump to the force of the wind, and on the wind dying away, so as to not have more force than is necessary to overcome the friction of the parts, the piece U is attached to the slide, so that when the pin E is drawn as near the center as is thought best for the shortest stroke it shall press the rod W into the groove in the clutch, bringing it between the gear, and thus prevent moving the slide to a shorter stroke, thus saving the necessity of the mills running when not having power enough to do some work. If wished, a similar contrivance can be arranged so as to operate the same on the pin E arriving at the extent of its stroke or slide, and where subject to severe squalls or gales may be necessary. The velocity of the motion given the screw G varies according to whether the driving-shaft J revolves in the same direction as the crank-shaft D or the opposite. Thus it may be made to reduce the work faster than it increases it, preventing any undue strain of parts, the motion of the screw being governed by what are called "the laws of planetary gear" in mechanics.

I am aware that the employment of a centrifugal governor to regulate the stroke of a pump or the amount of work by the available power of a windmill is not new. This, therefore, I do not claim; but What I do claim as my invention, and wish to secure by Letters Patent, is—

In combination with the adjustable or expanding crank, the projection U, attached to the slide of the crank-pin, the sliding rod W, upon which it acts for the purpose of engaging a grooved collar upon the spindle of the governor, whereby its adjusting-power is confined within a certain proper range, substantially as hereinbefore set forth.

In witness whereof I hereunto subscribe my name in the presence of two witnesses.

ETHAN ALLEN.

Witnesses:
L. D. GODDARD,
JAS. G. ARNOLD.